United States Patent [19]

Malani

[11] Patent Number: 5,772,252
[45] Date of Patent: Jun. 30, 1998

[54] PIPE JUNCTION HOLDER WITH A NOVEL TORQUE-LIMITING DEVICE

[76] Inventor: Jugal K. Malani, 15102 Berkshire Green, Houston, Tex. 77083

[21] Appl. No.: 491,270

[22] Filed: Jun. 16, 1995

[51] Int. Cl.⁶ ................................................. F16L 35/00
[52] U.S. Cl. .............................. 285/4; 403/2; 403/362; 411/5; 411/389; 285/337; 285/90; 285/374
[58] Field of Search .................. 285/4, 90, 404, 285/39, 337, 374; 411/3, 4, 5, 389, 383, 393; 403/2, 362

[56] References Cited

U.S. PATENT DOCUMENTS

| | | | |
|---|---|---|---|
| 3,191,486 | 6/1965 | Gibbens | 85/61 |
| 3,280,689 | 10/1966 | Rubin | 85/61 |
| 3,602,976 | 9/1971 | Grube | 29/407 |
| 3,897,112 | 7/1975 | Walther et al. | 411/389 X |
| 3,929,054 | 12/1975 | Gutshall | 85/61 |
| 3,951,556 | 4/1976 | Strizki | 403/2 |
| 3,967,906 | 7/1976 | Strizki | 403/2 |
| 4,046,052 | 9/1977 | Nordstrom | 85/61 |
| 4,092,036 | 5/1978 | Sato et al. | 285/337 |
| 4,131,816 | 12/1978 | Nakata | 310/348 |
| 4,144,796 | 3/1979 | Richter et al. | 85/61 |
| 4,504,180 | 3/1985 | Ishii et al. | 411/5 |
| 4,568,112 | 2/1986 | Bradley, Jr. et al. | 285/238 |
| 4,627,774 | 12/1986 | Bradley | 411/5 |
| 4,779,900 | 10/1988 | Shumard | 285/114 |
| 4,848,808 | 7/1989 | Pannell et al. | 285/4 X |
| 4,896,903 | 1/1990 | Shumard | 285/337 |
| 4,923,319 | 5/1990 | Dent | 403/2 |
| 5,052,719 | 10/1991 | Boehm | 285/4 |
| 5,474,408 | 12/1995 | Dinitz et al. | 403/2 X |

OTHER PUBLICATIONS

EBAA Iron Sales Inc., Wedge Action MEGALUG, 6 pages, date unknown.

*Primary Examiner*—Terry Lee Melius
*Assistant Examiner*—Heather Shackelford

[57] ABSTRACT

Thus, the present device provides a nut and bolt assembly having a lower threaded end and opposing upper threaded end. A first flange seats above the lower threaded end and an upper flange seats below the upper threaded end. A weak point having a known torque limit is provided below the upper flange. A nut is mounted on the upper threaded end. When the nut is turned beyond the torque limit of the weak point, it causes the bolt to break at the weak point. The bolt of the present invention is relatively inexpensive to make and use. It is designed preferably to be used in conjunction with a pressing member and a pipe junction holder for holding a pair of joined pipes.

5 Claims, 2 Drawing Sheets

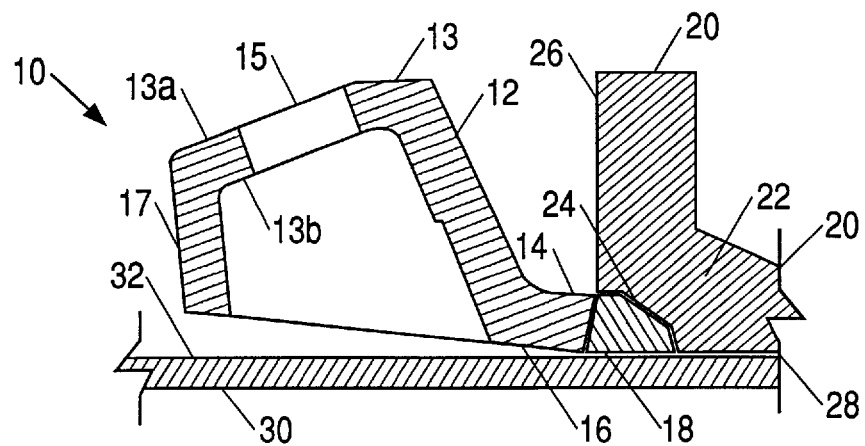
Figure 1
(Prior Art)
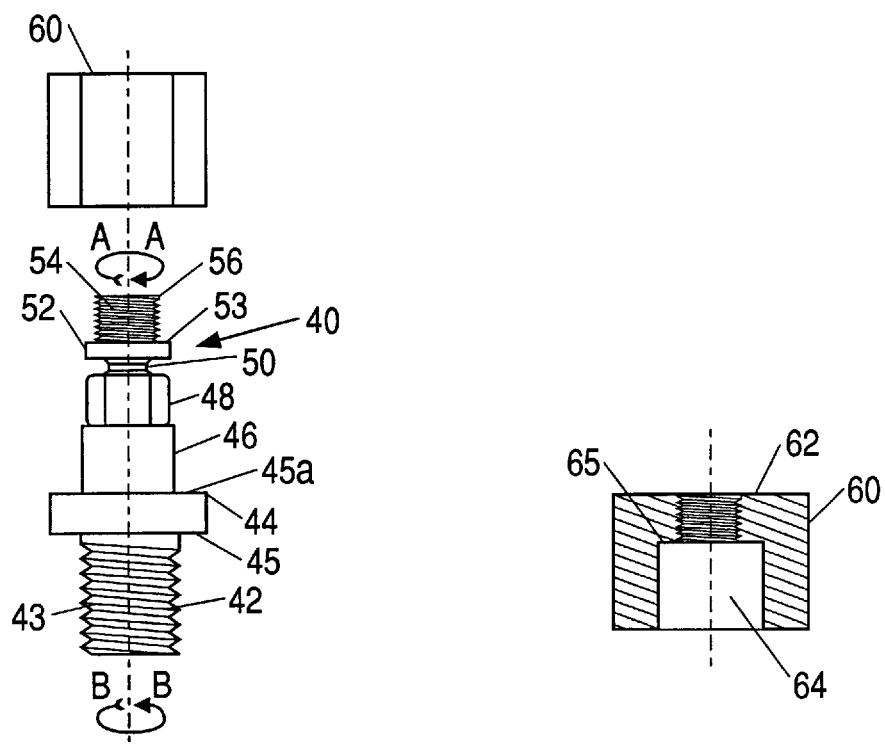
Figure 2
Figure 2A

PIPE JUNCTION HOLDER WITH A NOVEL TORQUE-LIMITING DEVICE

BACKGROUND OF THE INVENTION

1. Field of the Invention

This invention relates generally to mechanical joint restraint devices and more particularly to a novel torque-limiting nut and bolt for clamping a pipe junction holder to a pair of axially coupled pipes and other mechanical joint fittings.

2. Description of the Related Art

Several types of pipe junction holders (mechanical restraint devices) are known in the art. A frequently used pipe junction holder is disclosed in U.S. Pat. No. 4,092,036, issued to Sato et al. on May 30, 1978. This pipe junction holder comprises a substantially annular body 10 having a plurality of integral spaced clamping blocks, each such clamping block comprising a lateral top wall which extends sloped downwardly away from the body 10. A through-hole is provided in the lateral top for inserting therethrough a bolt 30, which causes a pressing member attached thereto to bite into the pipe.

Several types of clamping means have been proposed for use with the above-described pipe junction holder. For example, Sato describes two types of bolts which may be used with the above-described pipe junction holder. In many applications it is desirable to install the pipe processing member at a predetermined torque. The Sato bolts are torqued to the desired value by external devices such as torque wrenches. Operator error or use of incorrect tools can result in installing such bolts at torques lower or greater than the desired torque.

More recently, a torque-limiting nut and bolt assembly has been proposed in U.S. Pat. No. 4,627,774, issued to Bradley et al. on Dec. 9, 1986 for use with the Sato pipe junction holder. The Bradley bolt includes a bolt shank having a threaded first end portion and a non-threaded second end portion, a secondary drive head on the second shank portion and a primary shearable drive head on the secondary drive bread. A hollow nut is secured over both drive heads and a portion of the non-threaded shank section. The hollow nut drives the primary drive head which rotates relative to the secondary drive head until the primary drive head shears off at a predetermined torque releasing the nut and primary drive head. The secondary drive head remains on the shank for adjustment and removal of the bolt.

The present invention provides a novel torque-limiting nut and bolt which may be utilized with the above-described pipe junction holder. The nut and bolt of the present invention are relatively less expensive to manufacture and easier to install compared to the known prior art devices adapted for use with the above-noted pipe junction holder.

SUMMARY OF THE INVENTION

The present invention provides a pipe junction holder, comprising a substantially annular body having an integral clamping block containing a through opening; a bolt having: (i) a lower threaded end; (ii) a lower flange on the lower threaded end (iii) a shank having a neck for receiving a spanner thereon on the lower flange, said flange passing through the opening in the clamping block; (iv) a weak point on the shank; (v) an upper flange on the weak point; and (vi) an upper threaded end having threads in the direction opposite the direction of the threads on the lower end; (d) a pipe pressing member having internal threaded hole mounted on the lower threaded end of the bolt; and (f) a nut having an internal threaded portion and a seat therein mounted on the upper threaded end in a manner that enables the seat to be placed on the upper flange.

Examples of the more important features of the invention thus have been summarized rather broadly in order that detailed description thereof that follows may be better understood and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment taken in conjunction with the accompanying drawings, in which like elements have been given like numerals and wherein:

FIG. 1 shows a partial sectional elevation view of a pipe junction holder positioned in relation to a pair of joined pipes.

FIG. 2 shows a torque-limiting bolt and nut according to the present invention for use with the pipe junction holer of FIG. 1.

FIG. 2a shows a sectional elevation view of the nut shown in FIG. 2.

DETAILED DESCRIPTION OF THE PREFERRED EMBODIMENT

Figure 3:
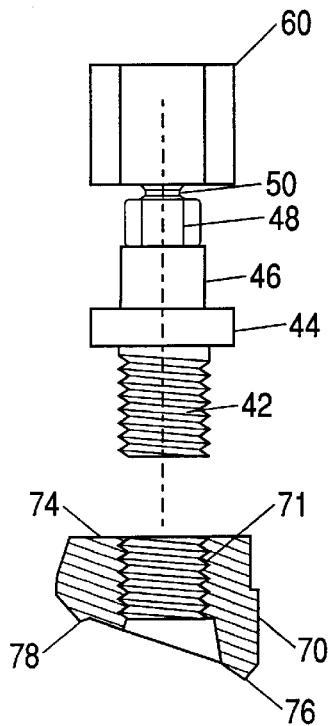
FIG. 3 shows the nut and bolt of FIG. 2 aligned with a pipe pressing member.

FIG. 1 shows a partial sectional view of a commonly used pipe junction holder 10 positioned for attachment with a pair of joined pipes 20 and 30, such as pipes joined to carry a fluid therethrough. Typically, to join two pipes together, the coupling end 22 of the first pipe 30 having an inside diameter at an internal surface 28 greater than the outside diameter at the surface 32 of the second pipe 30 is placed over the first pipe 20 as shown in FIG. 1. The coupling 22 has an outside enlarged mouth 24, a vertical wall 26 having a plurality of spaced holes (not shown) for attaching thereto a pipe junction holder, such as the pipe junction holder 10. In other certain applications, the member 30 may be a pipe fitting coupled to the pipe 20. The present invention, however, is equally applicable to such applications and other similar applications.

The pipe junction holder 10 has a substantially annular body 11 having an internal diameter defined at an internal surface 16 that is slightly greater than the outside diameter at the surface 32 of the pipe 30. The pipe junction holder 10 contains an annular projection 14 along its internal surface 16 that seats on the pipe 30 and abuts against the pipe mouth 24. An annular insert 18 may be placed substantially conforming to the inside dimensions of the mouth 24 may be placed therein. A plurality of spaced holes (not shown) are provided along the annular body 11. Such holes are aligned with the holes in the coupling flange 26 for coupling the flange 26 and the pipe junction holder 10 by a desired means, such as bolts (not shown).

The pipe junction holder 10 contains a plurality of integral clamping blocks 12 around the periphery of the annular body 11 extending away from the annular projection 14. The clamping block 12 has a wall 13 having slant surfaces 13a and 13b relative to the longitudinal surface of the pipe 30. A through hole 15 in the block 12 is provided for inserting therethrough a means for clamping the pipe junction holder 10 to the pipe 30. A substantially vertical wall 17 may be provided at the front of the wall 13 to retain the clamping member in the clamping block 12.

As noted earlier, the present invention provides a novel nut and bolt clamping means for use with a pipe junction holder, such as shown in FIG. 1. The clamping means of the present invention, however, may be utilized in any other suitable application. FIGS. 2 and 3 show the nut and bolt clamping means according to the present invention and FIGS. 4 and 5 show the use of the nut and bolt with the pipe junction holder 10 placed in relation to common types of joined pipes 20 and 30.

Turning now to FIGS. 2 and 3, the bolt 40 has an annular flange or shoulder 44 having a diameter that is greater than the smaller side of the hole 15 (FIG. 1), a lower threaded portion 42 and a substantially cylindrical shank 46, having dimensions that will enable the shank 46 to freely rotate in the hole 15. The upper portion of the shank 46 has a neck 48 which preferably may be turned by utilizing a readily available tool, such as a spanner. Any other suitable provision may be made in place of the neck 48 that will enable the bolt 40 to be turned by a desired means. The bolt 40 has a weak point 50 between the neck 48 and a second flange 52, which preferably is smaller in diameter than the lower flange 44, such that the bolt 40 can be inserted up through the hole 15 (FIG. 1) in the pipe junction holder 10 until the lower surface 13b of the pipe junction holder 10 seats on the upper surface 45a of the bottom flange 44, as shown in FIG. 5. The bolt 40 terminates at an upper threaded end 54 above the upper flange 52. The threads 56 made in the direction A—A on the upper end 54 are in opposite direction B—B to the threads 43 in the lower section 42 to work in cooperation with the pressing member 70 as explained below.

As shown in FIG. 2a a torque nut 60 having an upper threaded portion 62 and a lower hollow unthreaded portion 64 is threadably placed (screwed) on to the upper threaded end 54. The lower hollow portion 64 has an internal diameter less than the diameter of the flange 52 so that when the nut 60 is fully engaged with the threads 56, the seat 65 rests against the upper surface 53 of the flange 52. Any further tightening of the nut 60 will cause the bolt to rotate. If the threads 56 on the upper portion 54 accept the nut 60 in a clockwise rotation, then the entire bolt will rotate in the clockwise direction after the nut 60 has been fully engaged with the seat 53. A pipe pressing member 70 (FIG. 3), such as a wedge, is designed to engage with threads 43 of the lower portion 42. When the pressing member 70 is fully engaged with the bolt 40, the lower end 45 of the flange 44 may rest against the upper surface 71 of the pressing member 70. Teeth 76 and 78 are provided at the bottom side of the pressing member 70 for biting into the pipe 30.

Figure 4:
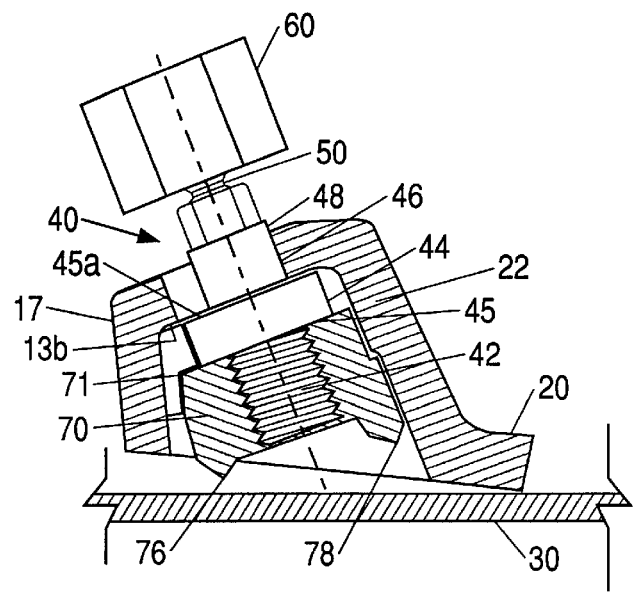
FIG. 4 shows the placement of the nut and bolt shown in FIG. 2 in the pipe junction holder positioned in relation to the pair of joined pipes shown in FIG. 1.
Figure 5:
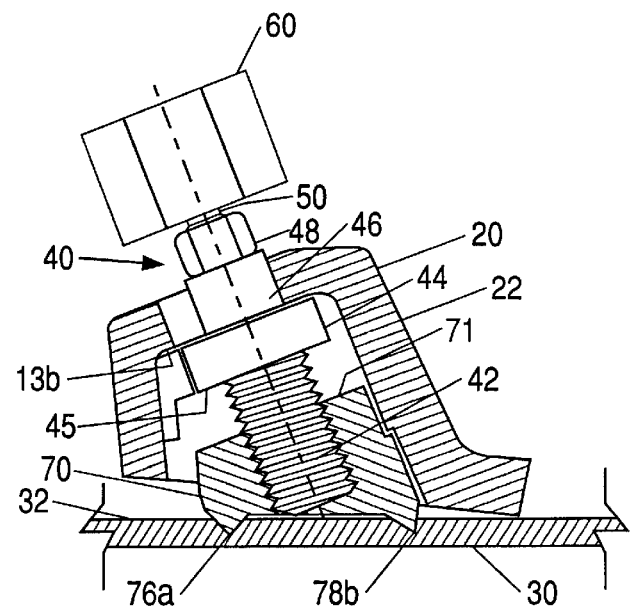
FIG. 5 shows the nut and bolt assembly of the present invention fully engaged with the pipe after the nut has been turned beyond a pre-determined torque limit.

FIGS. 4 and 5 show use of the nut 60 and bolt 40 shown in FIGS. 2 and 3 with the pipe junction holder 10 shown in FIG. 1. To engage the bolt 40 and nut 60 with the pipe junction holder 10, the bolt 40 is inserted in the hole 15 of the clamping block 12 so that the shank 46 lies in the hole 15. The pressing member 70 is fully engaged with the lower threaded end 42 and the nut 60 is fully engaged with the upper threaded end 54 (FIG. 2a). In this position, the seat 65 (FIG. 2a) of the nut 60 seats on the upper flange surface 53 and the upper surface 45a of the bottom flange 44 is placed near or against the lower surface 13b of the clamping block 12.

The nut 60 is then rotated in the direction A—A which causes the pressing member 70 to disengage from the lower end 42 because of the opposing direction of the threads, thereby causing the pressing member 70 to move downward toward the pipe and eventually bite into the pipe 30 at points 76a and 78b (see FIG. 5). When the torque on the nut 60 reaches a predetermined limit, the bolt breaks at the weak point 50. The bolt 40 may be removed by using an appropriate wrench on the neck 48 of the bolt 40. Any desired predetermined torque limit for the bolt 40 may be set by appropriately designing the weak point by known methods in the art. A torque limit of ninety (90) pounds is frequently used for clamping a pipe junction member of two joined pipes.

The use of a threaded break-off nut eliminates the need to replace the entire wedge assembly if the head breaks off prematurely. The pipe junction holders described herein are usually transported without protective packaging, which can cause some of the prior art bolts to break off. The design of the nut of the present invention ensures that the entire assembly remains together during transportation. Further, the vibration during transportation does not loosen the assembly.

The bolt of the present invention is relatively inexpensive to make and use. It preferably is designed for use with a wedge and a pipe junction holder. No special tools are required to install or replace the mechanical joint restraint device. The wedges preferably are designed to fit specific pipe sizes. Each wedge preferably is contoured to fit the outside diameter of its associated pipe. The wedges preferably are heat treated and the system of the present invention preferably is designed for use with various types of ductile iron pipes and pipe fittings. The system also is designed for high pressure applications, such as internal pipe pressures of up to 350 psi.

Thus, the present invention provides a nut and bolt assembly having a lower threaded end and opposing upper threaded end. A first flange seats above the lower threaded end and an upper flange seats below the upper threaded end. A weak point having a known torque limit is provided below the upper flange. A nut is mounted on the upper threaded end. When the nut is turned beyond the torque limit of the weak point, it causes the bolt to break at the weak point.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A torque-limiting bolt for use in cooperation with an apparatus having a threaded aperture, comprising:
    (a) a lower threaded portion for engagement with the threaded aperture of the apparatus, said lower portion having a top end and a bottom end;
    (b) a lower flange on the top end of the lower threaded portion;
    (c) a shank above the lower flange having a neck near the top for receiving a turning tool thereon and a weak point above the neck;
    (d) an upper flange above the weak point on the shank; and (e) an upper threaded portion above the upper flange having threads in the direction opposite to the direction of the threads on the lower portion, whereby the rotation of the bolt in the direction of the threads on the upper end causes the apparatus to disengage from the lower threaded portion of the bolt and to move away from the bolt to a maximum threshold distance whereby further rotation of the bolt in the same direction causes the bolt to break at the weak spot.

2. A torque-limiting bolt for use in cooperation with a first apparatus having a threaded aperture and a second apparatus having a non-threaded aperture, comprising a lower threaded portion having a top and a bottom and an upper threaded portion having a top and a bottom, a lower flange at the top of the lower threaded portion and an upper flange at the bottom of the upper threaded portion, a shank connecting the upper and lower flanges, said shank having a provision between the lower flange and the upper flange for turning the shank and a weak point between the turning provision and the upper flange, the threads on the lower and upper portions being in opposing directions, such that the rotation of the bolt in the direction of the threads on the upper portion causes the apparatus to disengage from the lower threaded portion of the bolt and to move away from the bolt to a maximum threshold distance whereby further rotation of the bolt in the same direction causes the bolt to break at the weak spot and the lower flange having a circumference greater than the non-threaded aperture of the second apparatus and the upper flange having a circumference smaller than the non-threaded aperture of the second apparatus such that the second apparatus can be positioned over the upper flange to abut against the lower flange.

3. A torque-limiting bolt for use in cooperation with an apparatus having a threaded aperture, comprising:
   (a) a first threaded shank at an upper end and a second threaded shank at a lower end for engagement with the threaded aperture of the apparatus, said threaded shanks being threaded in opposing directions, whereby the rotation of the bolt in the direction of the first threaded shank causes the apparatus to disengage from the second threaded shank thereby moving away from the bolt to a maximum threshold distance whereby further rotation of the bolt in the same direction causes the bolt to break at the weak spot;
   (b) a third shank between the first shank and the second shank, said third shank having a provision for rotating the bolt;
   (c) a first flange between the first shank and the third shank and a second flange between the second shank and the third shank; and
   (d) a weak point between the first flange and the third shank.

4. A torque-limiting nut and bolt assembly for use in cooperation with a first apparatus having a threaded aperture and a second apparatus having a non-threaded aperture, comprising a lower threaded portion having a top and a bottom and an upper threaded portion having a top and a bottom, a lower flange on the top of the lower threaded portion and an upper flange on the bottom of the upper threaded portion, a shank between the upper and lower flanges, said shank having a provision between the lower flange and the upper flange for turning the shank and a weak point between the turning provision and the upper flange, the threads on the lower and upper portions being in opposing directions, whereby the rotation of the bolt in the direction of the threads on the upper threaded portion causes the first apparatus to disengage from the lower threaded portion of the bolt and to move away from the bolt to a maximum threshold distance whereby further rotation of the bolt in the same direction causes the bolt to break at the weak spot, the lower flange having a circumference greater than the upper flange such that the second apparatus can be positioned over the upper flange to rest against the lower flange, and a nut having a threaded portion and a seat therein, said nut placed on the upper threaded portion with the seat abutting the upper flange.

5. A pipe junction holder for use in cooperation with an apparatus having a threaded aperture, comprising:
   (a) an integral clamping block containing a through opening;
   (b) a bolt having:
      (i) a lower threaded portion with top and bottom ends;
      (ii) a lower flange on the top end of the lower threaded portion;
      (iii) a shank above the lower flange having a neck for receiving a turning tool thereon, said flange passing through the opening in the clamping block and a weak point on the shank above the neck;
      (iv) an upper flange above the weak point; and
      (v) an upper threaded portion above the upper flange having top and bottom ends and having threads in the direction opposite the direction of the threads on the lower portion;
   (c) a pipe pressing member having an internal threaded hole for engaging the lower threaded portion of the bolt, whereby the rotation of the bolt in the direction of the threads on the upper portion causes the pipe pressing member to disengage from the lower threaded portion of the bolt and to move away from the bolt to a maximum threshold distance whereby further rotation of the bolt in the same direction causes the bolt to break at the weak spot; and
   (d) a nut having an internal threaded portion and a seat therein mounted on the upper threaded portion in a manner that enables the seat to be placed on the upper flange.

* * * * *